United States Patent
Huang

(10) Patent No.: US 9,454,977 B1
(45) Date of Patent: Sep. 27, 2016

(54) AUTOMATIC RECORD PLAYER FOR PLAYING A PHONOGRAPH RECORD

(71) Applicant: YA HORNG ELECTRONIC CO., LTD., Tainan (TW)

(72) Inventor: Jin-Yi Huang, Tainan (TW)

(73) Assignee: Ya Horng Electromic Co., Ltd., Tainan (TW)

( * ) Notice: Subject to any disclaimer, the term of this patent is extended or adjusted under 35 U.S.C. 154(b) by 0 days.

(21) Appl. No.: 14/857,333

(22) Filed: Sep. 17, 2015

(30) Foreign Application Priority Data

Apr. 17, 2015 (TW) .............................. 104205881 U

(51) Int. Cl.
| | |
|---|---|
| *G11B 19/22* | (2006.01) |
| *G11B 17/10* | (2006.01) |
| *G11B 3/34* | (2006.01) |
| *G11B 3/06* | (2006.01) |

(52) U.S. Cl.
CPC .. *G11B 3/34* (2013.01); *G11B 3/06* (2013.01)

(58) Field of Classification Search
CPC ..... G11B 3/34; G11B 15/093; G11B 15/442; G11B 19/38; G11B 25/043; G11B 5/5521; G11B 17/038; G11B 17/10; G11B 17/225; G11B 17/22; G11B 5/6005; G11B 17/02; G11B 17/16; G11B 3/125; G11B 3/095; G11B 27/002; G11B 27/105
USPC ...... 369/231, 233, 255, 271.1, 30.27, 30.06, 369/216; 360/74.2, 86, 73.03, 99.12, 264, 360/254, 98.06
See application file for complete search history.

(56) References Cited

U.S. PATENT DOCUMENTS 4,085,940 A * 4/1978 Hoshimi ................ G11B 3/095
                                                                         369/225

* cited by examiner

*Primary Examiner* — Nabil Hindi
(74) *Attorney, Agent, or Firm* — McNees Wallace & Nurick LLC

(57) ABSTRACT

A novel automatic record player for playing a phonograph record includes a base, a turntable, upper and lower hubs, a tonearm, a drive unit, a pinion, a control cam, a main arm, an auxiliary arm, first and second micro-switches, a clutch member, a first clutch actuating member, a switch activating member, an actuating pin, a synchronizing unit, a position guide, and an elongated member. When the clutch member is actuated by the first clutch actuating member, the tonearm is automatically positioned on the phonograph record.

12 Claims, 16 Drawing Sheets

AUTOMATIC RECORD PLAYER FOR PLAYING A PHONOGRAPH RECORD

CROSS-REFERENCE TO RELATED APPLICATION

This application claims priority from Taiwanese application no. 104205881, filed on Apr. 17, 2015.

FIELD

The disclosure relates to a record player, more particularly to an automatic record player for playing a phonograph record.

BACKGROUND

A conventional record player includes a base, a turntable rotatably mounted on an upper surface of the base for supporting a phonograph record, and a tonearm which carries a pickup stylus for tracking a spiral record groove in a phonograph record. The tonearm can be automatically positioned on the phonograph record to begin a playing cycle. When the playing cycle is completed, the tonearm is displaced from the phonograph record to be clear of the turntable.

SUMMARY

An object of the disclosure is to provide a novel automatic record player for playing a phonograph record.

According to the disclosure, an automatic record player for playing a phonograph record includes a base, a turntable, upper and lower hubs, a tonearm, a drive unit, a pinion, a control cam, a main arm, an auxiliary arm, first and second micro-switches, a clutch member, a first clutch actuating member, a switch activating member, an actuating pin, a synchronizing unit, a position guide, and an elongated member. The base has upper and lower surfaces opposite to each other in an upright direction. The turntable is rotatably mounted on the upper surface of the base about a turntable axis for supporting the phonograph record. The upper and lower hubs are coaxially and rotatably mounted on the upper and lower surfaces of the base, respectively, and are configured to be co-rotatable about a swivel axis parallel to the turntable axis. The upper hub is disposed outwardly from the turntable. The tonearm has a forward free end and a rearward end. The rearward end is coupled to and rotatable with the upper hub about the swivel axis so as to permit the forward free end to be angularly displaceable among an outermost position, where the forward free end is disposed beyond a marginal edge of the phonograph record, a starting position, where the forward free end is in vertical register with an outermost groove of the phonograph record, and an innermost position, where the forward free end is in vertical register with an innermost groove of the phonograph record. The drive unit has an output shaft configured to drive the turntable to rotate about the turntable axis. The pinion has gear teeth and is disposed on a lower surface of the turntable to be rotated with the turntable about the turntable axis. The control cam has a wheel body which defines a wheel axis, and a plurality of driven teeth which are disposed on a rim of the wheel body to surround the wheel axis, and which are configured to mesh with the gear teeth of the pinion so as to permit the wheel body to be driven by the pinion. The control cam further has a cutout portion configured to interrupt the driven teeth, the wheel body having upper and lower major surfaces. The lower major surface has a cycle route which has an origin point and a midway point. The main arm includes an arm body having proximate and distal ends, and a cam follower pin which is fixed to the proximate end, and which is configured to be guided by and moved along the cycle route such that when the cam follower pin is moved from the origin point to the midway point, the distal end is displaced from a close position to a remote position, and such that when the cam follower pin is moved from the midway point back to the origin point, the distal end is displaced from the remote position to the close position. The auxiliary arm is pivotally mounted on the main arm about a pivot axis, and has a claw end segment which includes a cam follower region and a claw region. The claw region is angularly displaceable about the pivot axis between an initial position and a free position. The first and second micro-switches are disposed distal from and proximate to the wheel body, respectively, and are electrically connected to the drive unit such that when at least one of the first and second micro-switches is in a switch-on state, the turntable is driven by the output shaft to rotate about the turntable axis. The clutch member is pivotally mounted on the upper major surface of the wheel body, and has a clutch end which is angularly displaceable between an idle position, where the clutch end is disposed away from the cutout portion, and an active position, where the clutch end extends into the cutout portion to permit the clutch end to be engaged with the pinion so as to initiate rotation of the wheel body through meshing engagement between the driven teeth of the control cam and the gear teeth of the pinion. The first clutch actuating member is disposed in proximity of the wheel body to displace the clutch end to the active position, and is configured to be displaceable between a first actuating position, where the clutch end is in the active position, and a first non-actuating position, where the clutch end is in the idle position. The switch activating member has a switch activating region and a cam region, and is displaceable between a switch-off position and a switch-on position. The switch activating region is configured such that when the switch activating member is in the switch-off position, the first micro-switch is retained in a switch-off state by the switch activating region, and such that when the switch activating member is displaced to the switch-on position, the first micro-switch is set free from the switch activating region and returns to the switch-on state. The cam region is configured such that when the switch activating member is displaced from the switch-off position to the switch-on position to thereby permit the distal end of the arm body to be displaced from the close position to the remote position, the cam follower region is brought into cam engagement with the cam region to thereby displace the claw region to the free position. The actuating pin is disposed on the claw end segment and is configured to force the switch activating member back to the switch-off position once the claw region is displaced to the free position. The synchronizing unit is configured to couple the switch activating member to the first clutch member such that when the switch activating member is displaced to the switch-on position, the first clutch actuating member is simultaneously displaced to the first actuating position, and such that when the switch activating member is displaced to the switch-off position, the first clutch actuating member is simultaneously displaced to the first non-actuating position. The position guide is disposed to be rotatable with the lower hub so as to permit the tonearm to rotate with the position guide about the swivel axis. The position guide is configured to be hooked by the claw region once the claw region is displaced to the free position so as to permit the tonearm to be displaced from the outermost position to the starting position when the distal end is displaced from the remote position toward the close position. The elongated member is coupled to the position guide, and has an activating region which is configured such that the second micro-switch is retained in a switch-off state by the activating region when the distal end is in the close position and when the tonearm is in the outermost position, and such that when the distal end is displaced from the close position or when the tonearm is displaced from the outermost position, the second micro-switch is set free from the activating region and returns to the switch-on state.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
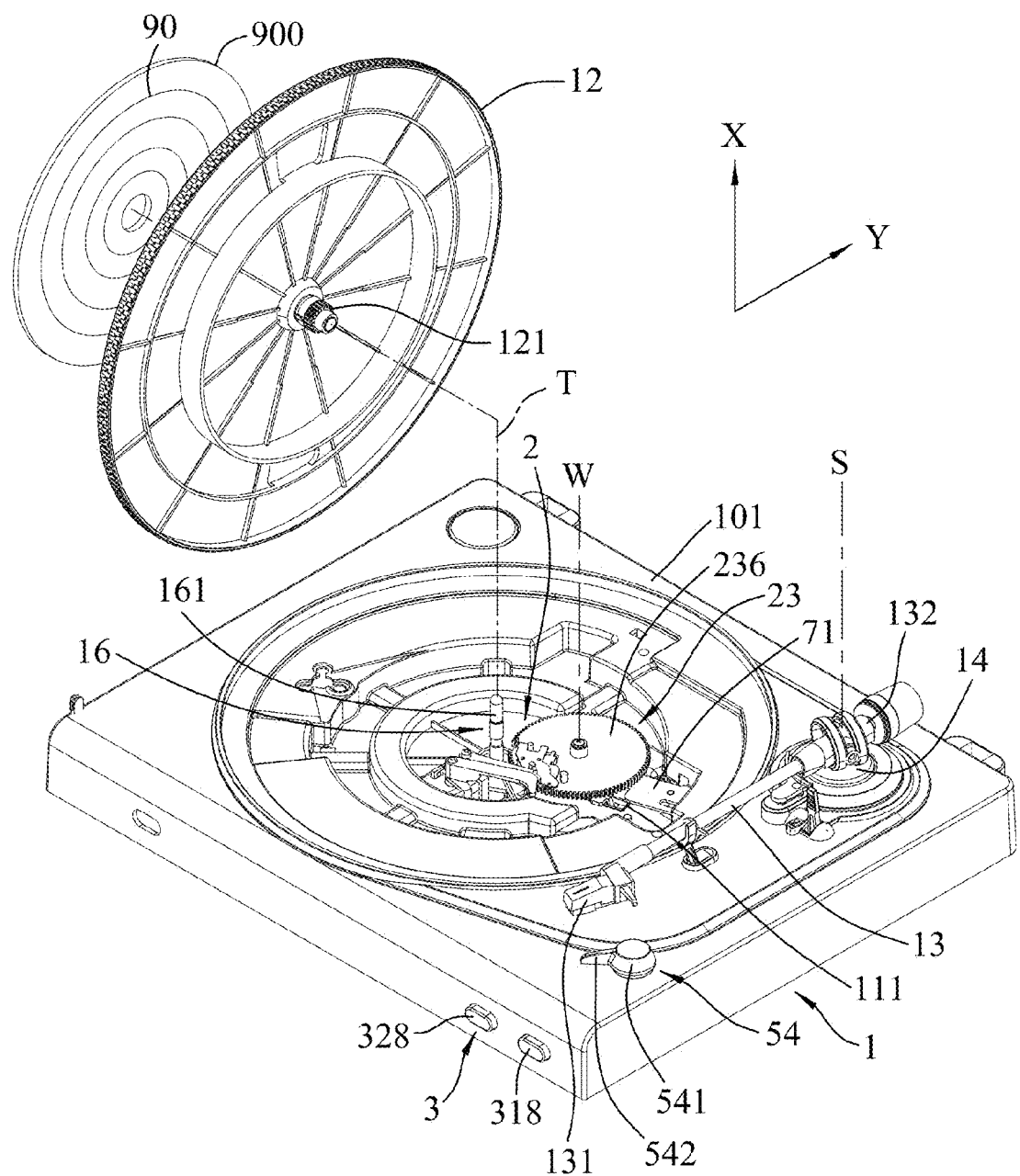
FIG. 1 is a partial exploded perspective view of an embodiment of an automatic record player according to the disclosure.

With reference to FIGS. 1, 2, 3, and 6, an embodiment of an automatic record player according to this disclosure is used for playing a phonograph record 90. The automatic record player includes a base 1, a turntable 12, a tonearm 13, an upper hub 14, a lower hub 15, a drive unit 16, a pinion 121, a transmission assembly 2, a play control assembly 3, a guiding unit 4, a position adjusting unit 5, and a switch unit 6.

The transmission assembly 2 includes a first clutch actuating member 21, a control cam 23, a clutch member 232, and an arm assembly 7. The arm assembly 7 is disposed to couple the control cam 23 to the tonearm 13, and includes a main arm 71, an auxiliary arm 72, an actuating pin 721, a position guide 731, and an elongated member 730.

The play control assembly 3 includes a synchronizing unit 31. The guiding unit 4 includes a switch activating member 42. The switch unit 6 includes first and second micro-switches 61, 62.

Figure 2:
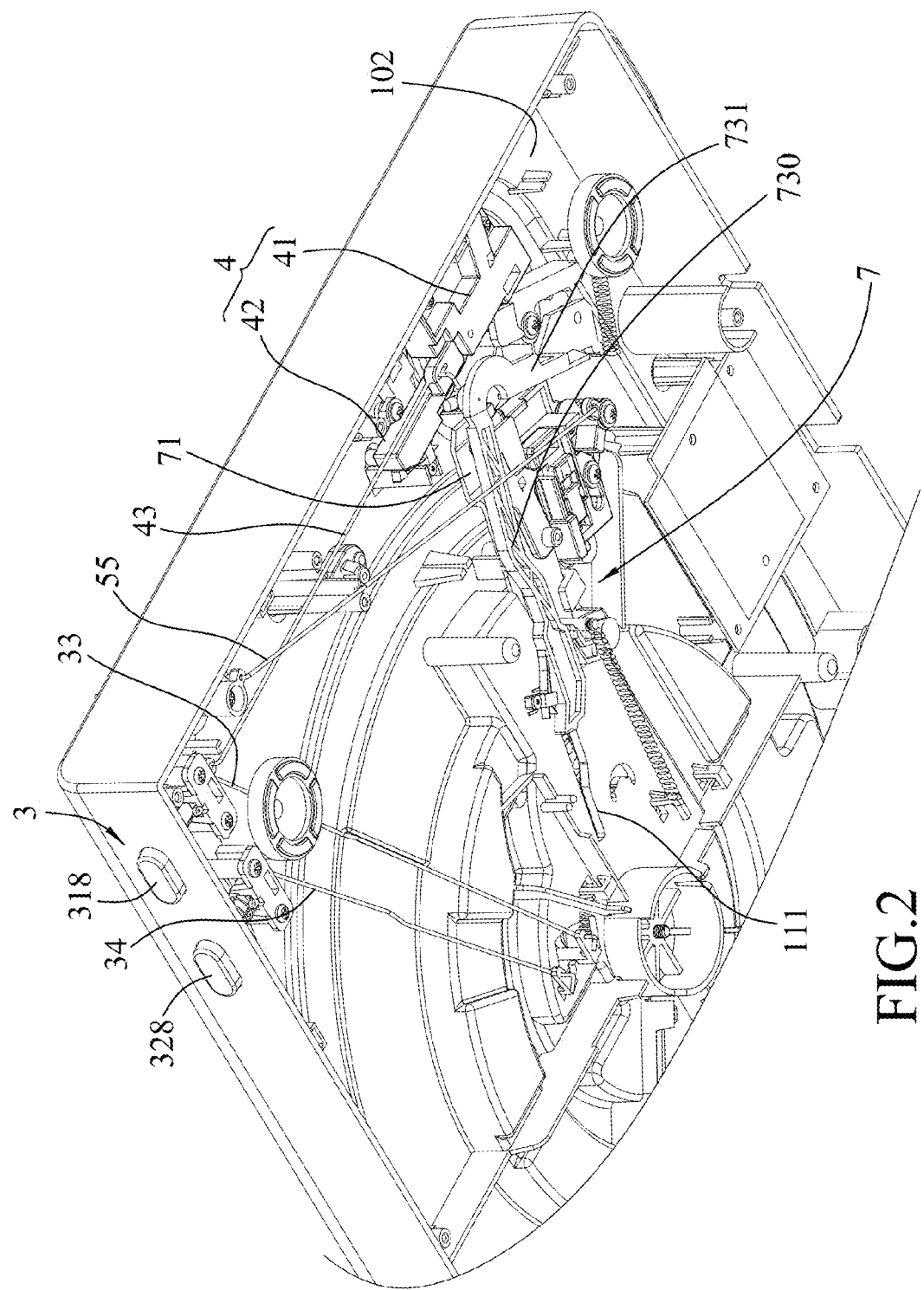
FIG. 2 is a fragmentary enlarged perspective view illustrating a bottom side of the automatic record player.
Figure 4:
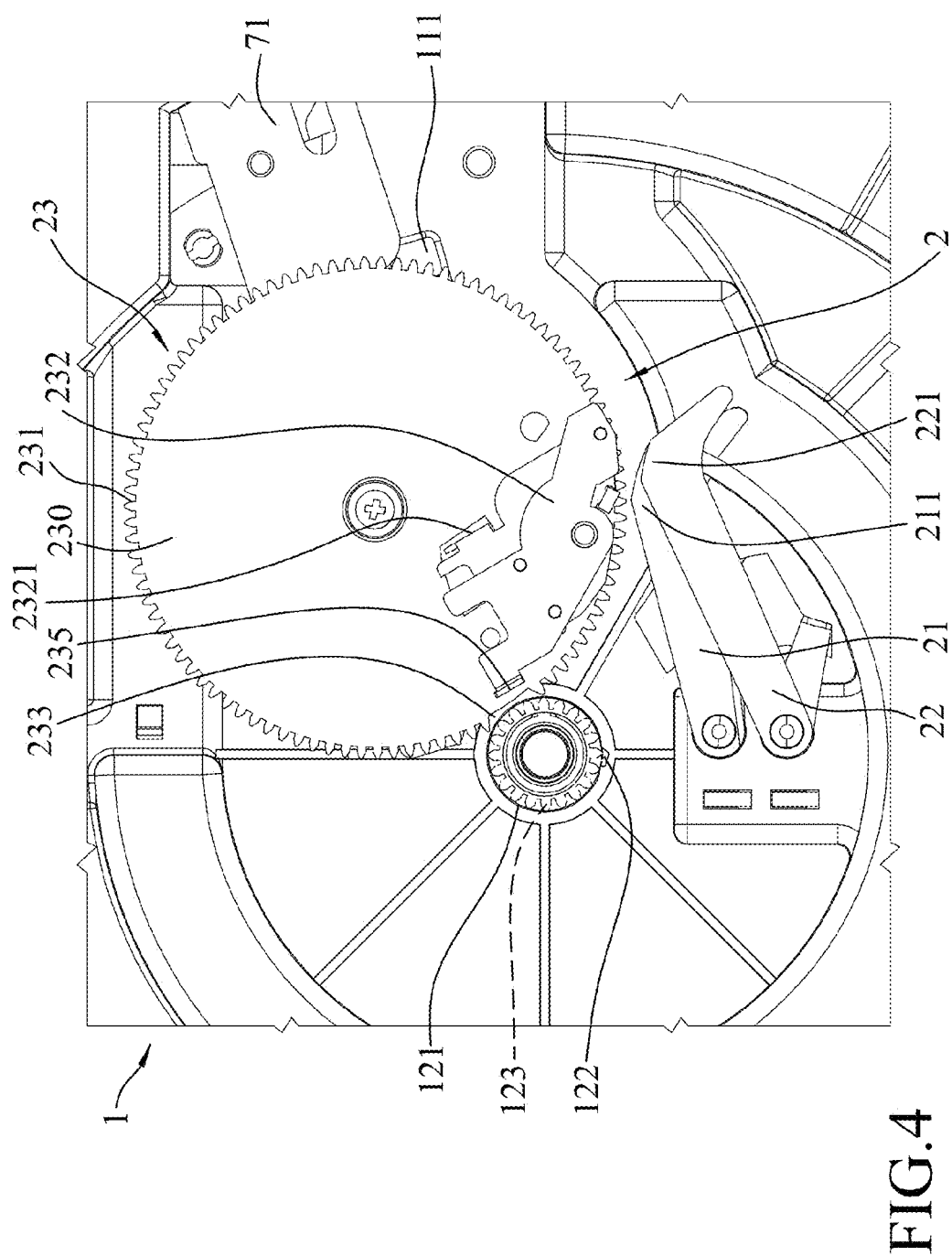
FIG. 4 is a fragmentary enlarged top view of the automatic record player.

The base 1 has upper and lower surfaces 101, 102 opposite to each other in an upright direction (X), and a guiding slot 111 extending through the upper and lower surfaces 101, 102 (see FIGS. 1, 2, and 4).

Figure 6:
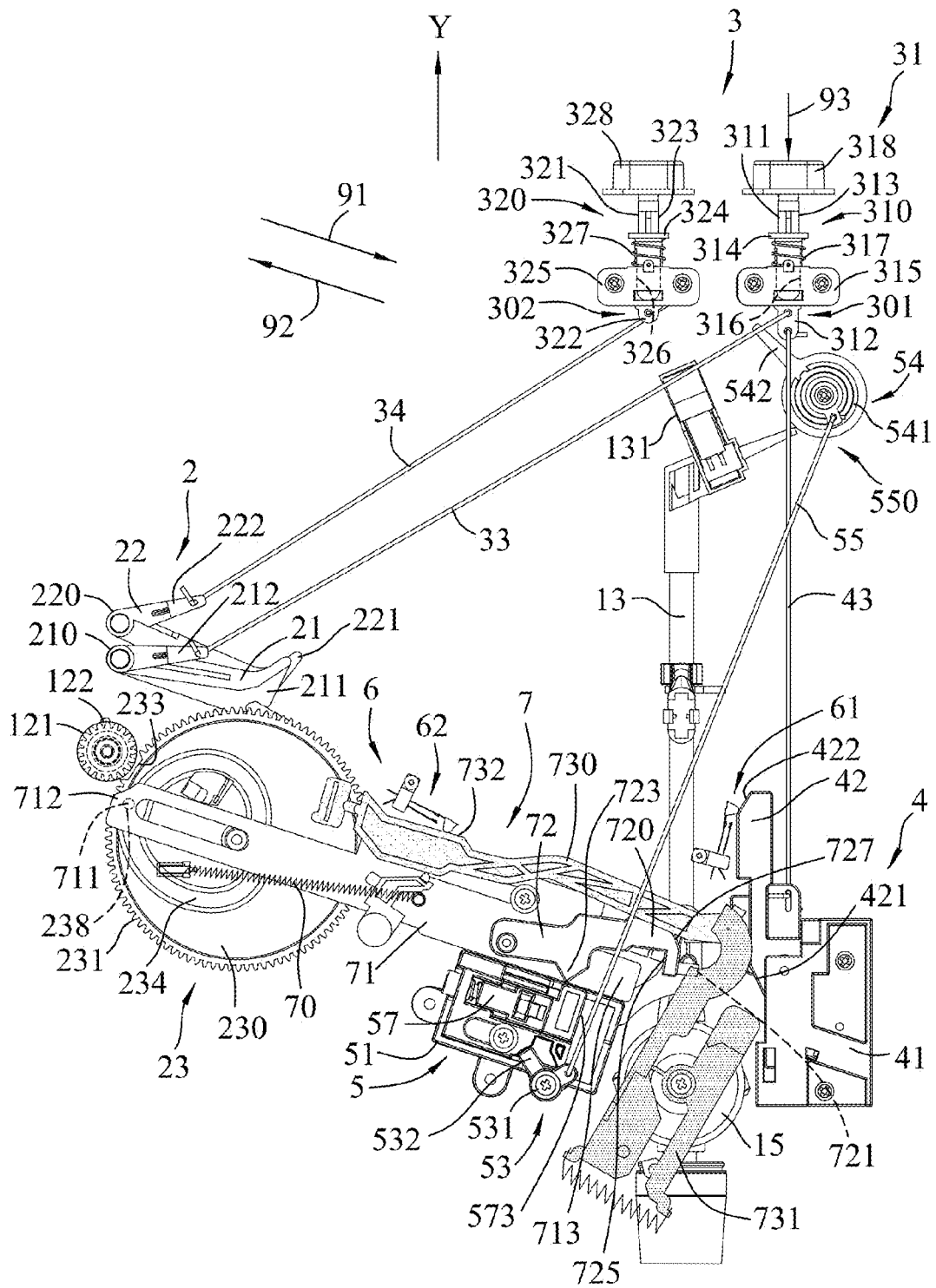
FIG. 6 is a fragmentary bottom view of the automatic record player.

The turntable 12 is rotatably mounted on the upper surface 101 of the base 1 about a turntable axis (T) for supporting the phonograph record 90. As shown in FIGS. 1 and 6, the upper and lower hubs 14, 15 are coaxially and rotatably mounted on the upper and lower surfaces 101, 102 of the base 1, respectively, and are configured to be co-rotatable about a swivel axis (S) parallel to the turntable axis (T). The upper hub 14 is disposed outwardly from the turntable 12.

The tonearm 13 has a forward free end 131 and a rearward end 132. The rearward end 132 is coupled to and rotatable with the upper hub 14 about the swivel axis (S) so as to permit the forward free end 131 to be angularly displaceable among an outermost position (FIGS. 1 and 6), where the forward free end 131 is disposed beyond a marginal edge 900 of the phonograph record 90, a starting position (FIGS. 10 and 14), where the forward free end 131 is in vertical register with an outermost groove 901 of the phonograph record 90, and an innermost position (not shown), where the forward free end 131 is in vertical register with an innermost groove 902 of the phonograph record 90.

The drive unit 16 has an output shaft 161 which is configured to drive the turntable 12 to rotate about the turntable axis (T).

The pinion 121 has gear teeth 123, and is disposed on a lower surface of the turntable 12 to be rotated with the turntable 12 about the turntable axis (T).

Figure 3:
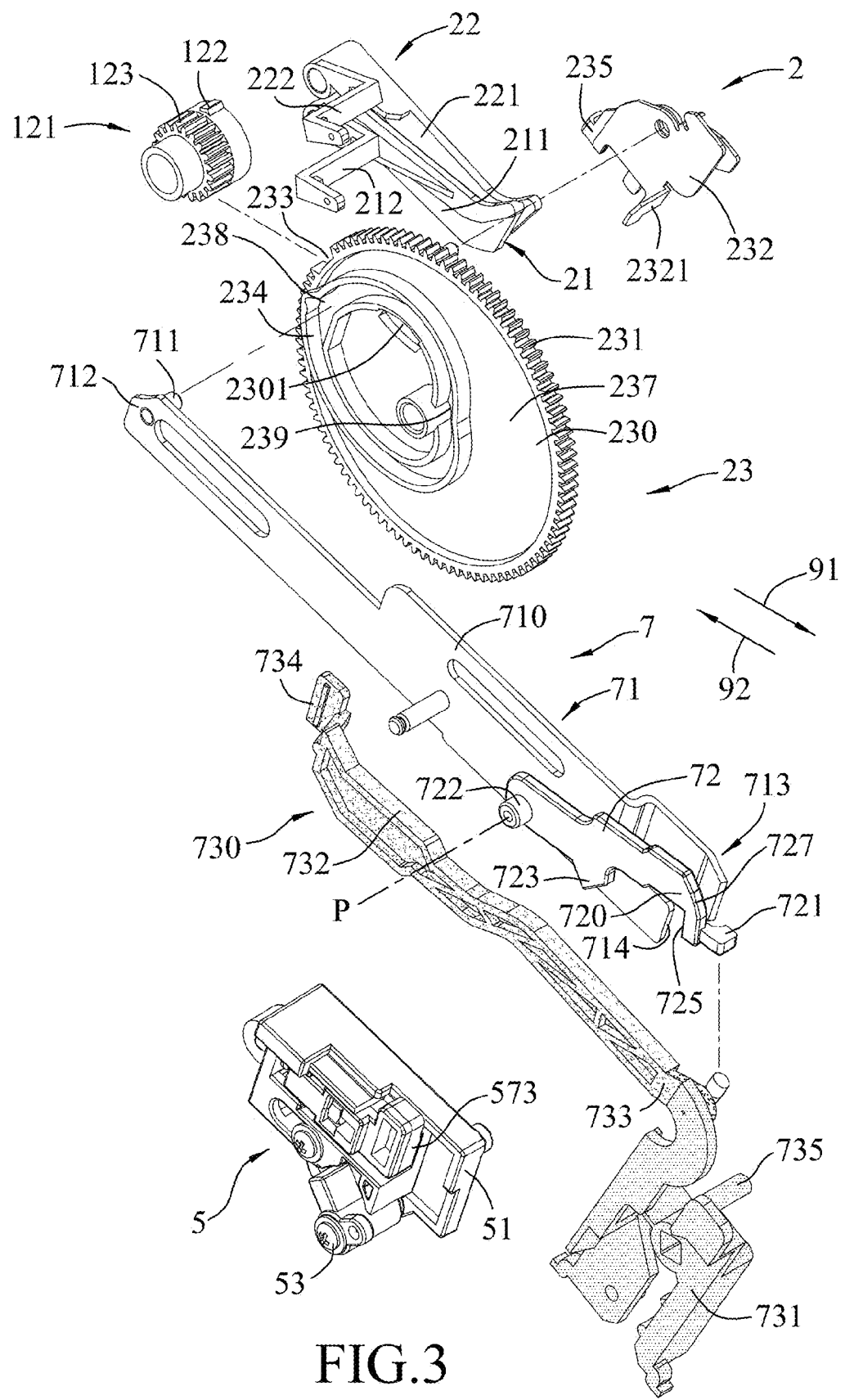
FIG. 3 is a partial exploded perspective view illustrating some elements of the automatic record player.

With reference to FIGS. 1 and 3, the control cam 23 is rotatably disposed on the upper surface 101 of the base 1, and has a wheel body 230, a plurality of driven teeth 231, and a cutout portion 233. The wheel body 230 defines a wheel axis (W), and has upper and lower major surfaces 236, 237. The driven teeth 231 are disposed on a rim of the wheel body 230 to surround the wheel axis (W), and are configured to mesh with the gear teeth 123 of the pinion 121 so as to permit the wheel body 230 to be driven by the pinion 121. The cutout portion 233 is configured to interrupt the driven teeth 231. The lower major surface 237 has a cycle route 234 which has an origin point 238 and a midway point 239.

Figure 13:
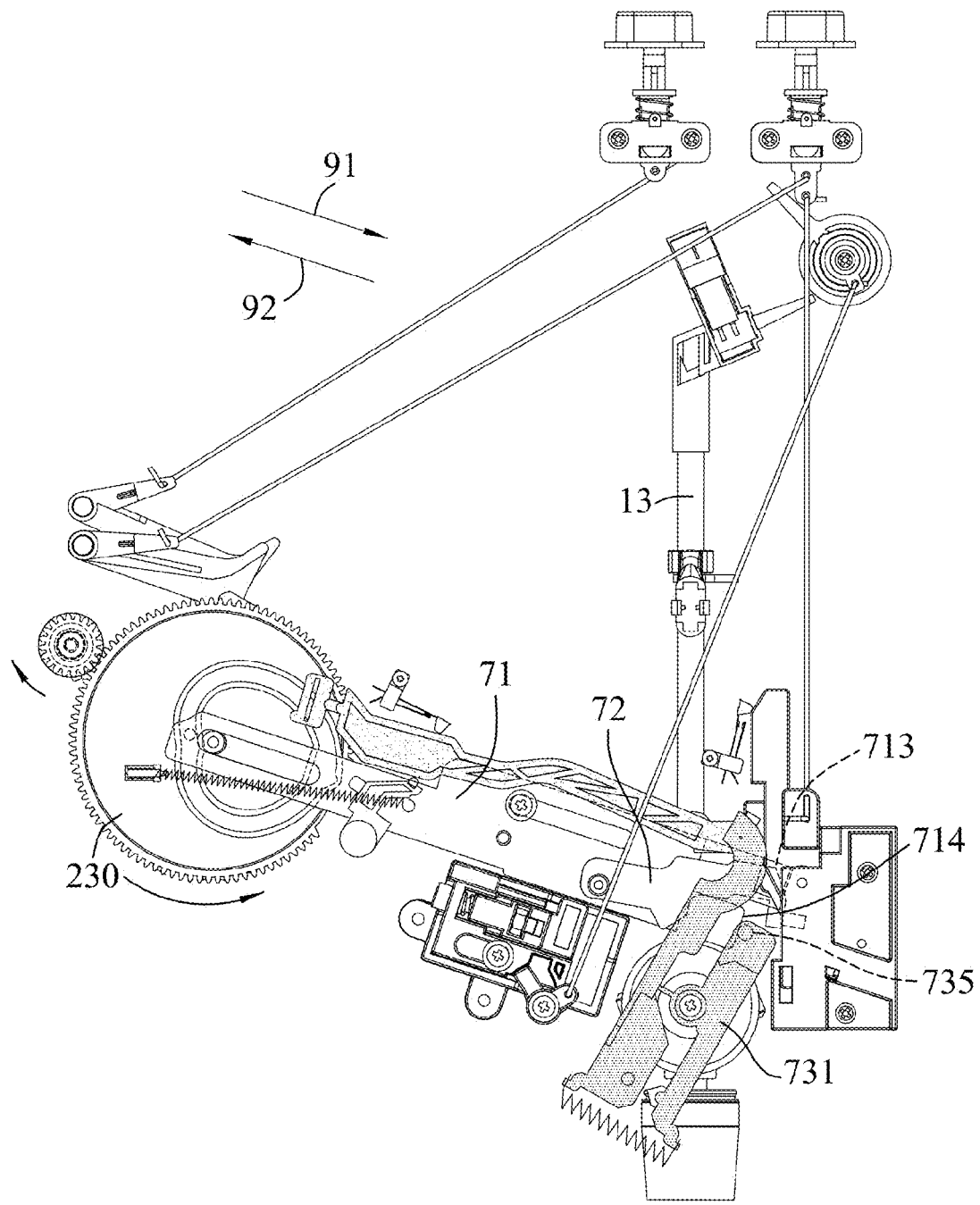

As shown in FIGS. 3 and 6, the main arm 71 includes an arm body 710 having proximate and distal ends 712, 713, and a cam follower pin 711. The distal end 713 is displaceable between close and remote positions relative to the wheel body 230. The cam follower pin 711 is fixed to the proximate end 712, and is configured to be guided by and moved along the cycle route 234 such that when the cam follower pin 711 is moved from the origin point 238 to the midway point 239, the distal end 713 is displaced from the close position (FIG. 6 or 11) to the remote position (FIG. 9 or 13) along an arrow direction 91, and such that when the cam follower pin 711 is moved from the midway point 239 back to the origin point 238, the distal end 713 is displaced from the remote position (FIG. 9 or 13) to the close position (FIG. 11 or 6) along an arrow direction 92. In this embodiment, a spring 70 is disposed to bias the distal end 713 to the close position. The main arm 71 extends through the base 1 such that it is partly located at the upper surface 101 and partly located at the lower surface 102 of the base 1 (see FIGS. 1 and 2).

As shown in FIG. 3, the auxiliary arm 72 has a pivot end 722, a claw end segment 720, and a cam follower protrusion 723 disposed between the pivot end 722 and the claw end segment 720. The auxiliary arm 72 is pivotally mounted on the main arm 71 about a pivot axis (P) by means of the pivot end 722. The claw end segment 720 includes a cam follower region 727 and a claw region 725. The claw region 725 is angularly displaceable about the pivot axis (P) between an initial position (FIG. 6), where the claw end segment 720 is retained by the distal end 713, and a free position (FIG. 9), where the claw end segment 720 is set free from the distal end 713.

The first and second micro-switches 61, 62 are disposed distal from and proximate to the wheel body 230, respectively, and are electrically connected to the drive unit 16 such that when at least one of the first and second micro-switches 61, 62 is in a switch-on state, the turntable 12 is driven by the output shaft 161 to rotate about the turntable axis (T). Each of the first and second micro-switches 61, 62 is normally in the switch-on state, and has two metal pieces which are biased to be electrically connected to each other.

The clutch member 232 is pivotally mounted on the upper major surface 236 of the wheel body 230, and has a clutch end 235 which is angularly displaceable between an idle position (FIG. 4), where the clutch end 235 is disposed away from the cutout portion 233, and an active position (FIG. 5), where the clutch end 235 extends into the cutout portion 233 to permit the clutch end 235 to be engaged with the pinion 121 so as to initiate rotation of the wheel body 230 by virtue of meshing engagement between the driven teeth 231 of the control cam 23 and the gear teeth 123 of the pinion 121. In this embodiment, the pinion 121 is formed with a protrusion 122 configured to engage the clutch end 235 once the clutch end 235 is displaced to the active position.

The first clutch actuating member 21 is disposed in proximity of the wheel body 230 to displace the clutch end 235 of the clutch member 232 to the active position, and is configured to be displaceable between a first actuating position (FIG. 5), where the clutch end 235 is in the active position, and a first non-actuating position (FIG. 4), where the clutch end 235 is in the idle position. As shown in FIGS. 3 and 6, the first clutch actuating member 21 is an angular lever and has a first fulcrum region 210 pivotally mounted to the base 1, a first power region 212, and a first weight region 211. The first weight region 211 is angularly displaced from the first power region 212, and is configured to displace the clutch end 235 to the active position when the first clutch actuating member 21 is displaced to the first actuating position.

Figure 8:
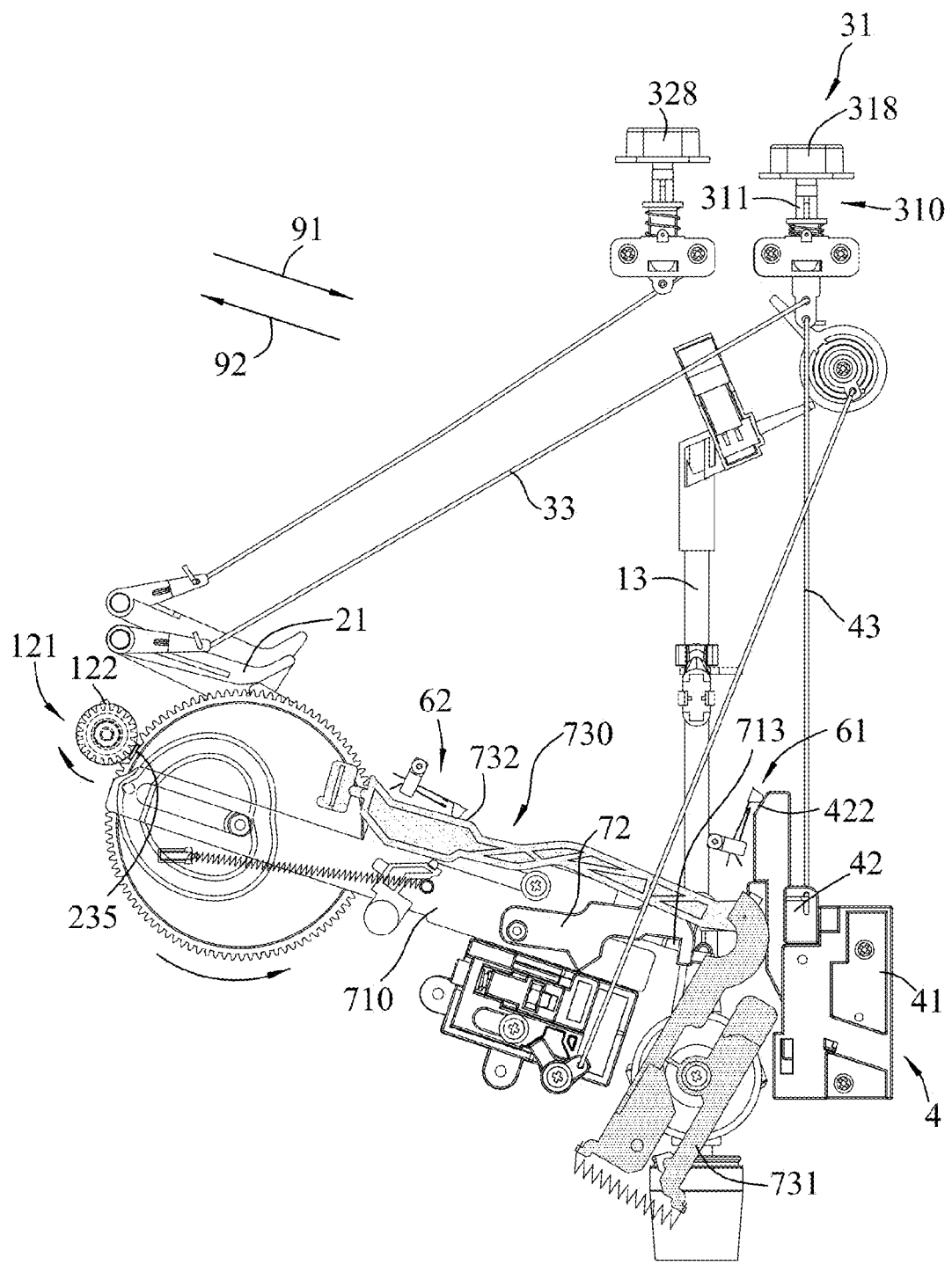
FIGS. 8 to 11 are similar to FIG. 6, but illustrating the operation of a control cam after a start push button is depressed.
Figure 9:
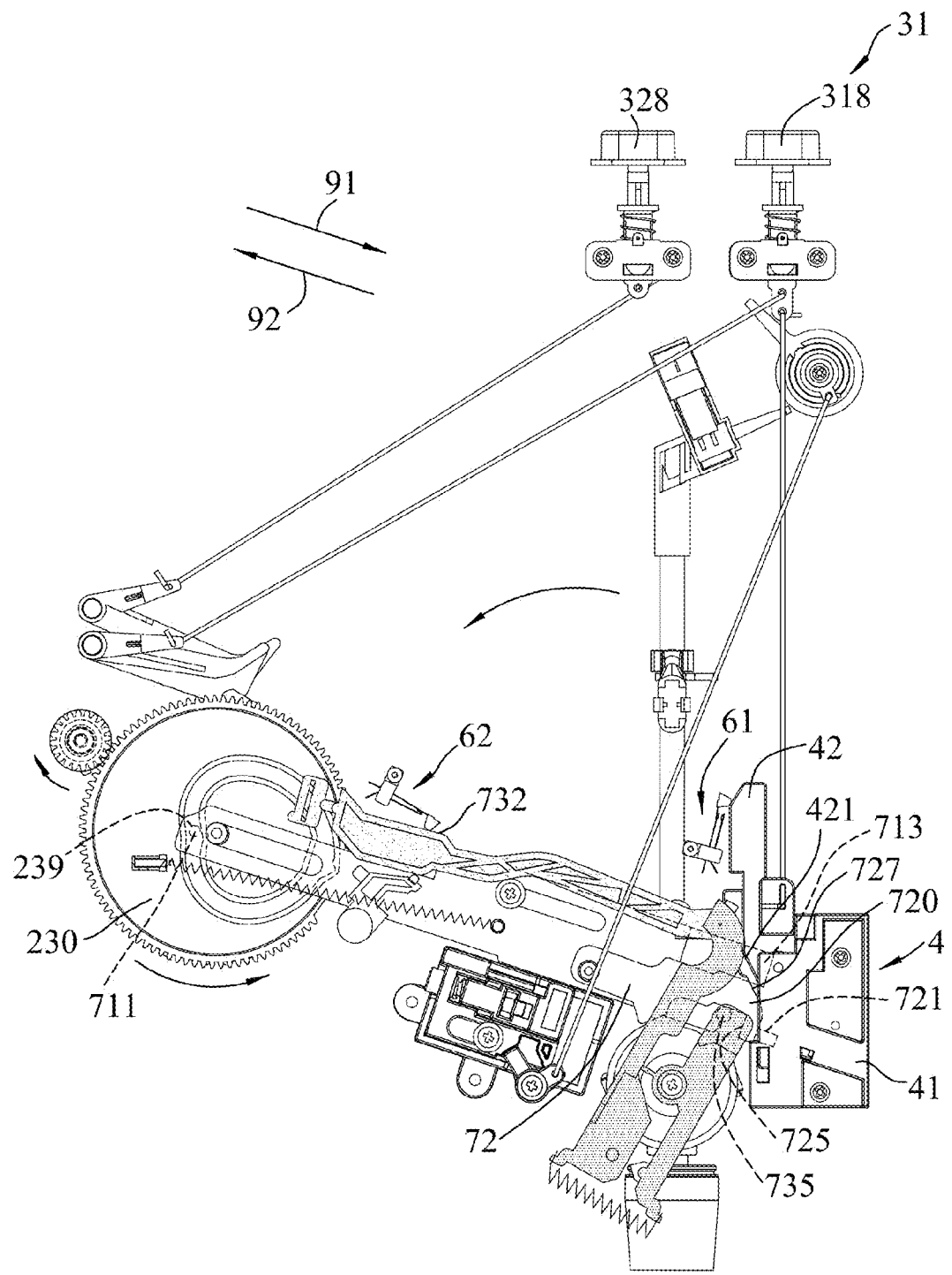

The switch activating member 42 is disposed on the lower surface 102 of the base 1, has a switch activating region 422 and a cam region 421, and is displaceable between a switch-off position (FIG. 6) and a switch-on position (FIG. 8). The switch activating region 422 is configured such that when the switch activating member 42 is in the switch-off position (FIG. 6), the first micro-switch 61 is retained in a switch-off state by the switch activating region 422, and such that when the switch activating member 42 is displaced to the switch-on position (FIG. 8), the first micro-switch 61 is set free from the switch activating region 422 and returns to the switch-on state. The cam region 421 is configured such that when the switch activating member 42 is displaced from the switch-off position (FIG. 6) to the switch-on position (FIG. 8) to thereby permit the distal end 713 of the arm body 710 to be displaced from the close position (FIG. 6) to the remote position (FIG. 8), the cam follower region 727 of the auxiliary arm 72 is brought into cam engagement with the cam region 421 to thereby displace the claw region 725 to the free position (FIG. 9).

The actuating pin 721 is disposed on the claw end segment 720 and is configured to force the switch activating member 42 back to the switch-off position (FIG. 9) once the claw region 725 is displaced to the free position. In this embodiment, the guiding unit 4 further includes a mounting seat 41 mounted on the lower surface 102 of the base 1. Once the switch activating member 42 is displaced to the switch-on position (FIG. 8), the switch activating member 42 is locked to the mounting seat 41. Once the claw region 725 is displaced to the free position, the lock between the mounting seat 41 and the switch activating member 42 is unlocked by the actuating pin 721.

With reference to FIG. 6, the synchronizing unit 31 is configured to couple the switch activating member 42 to the first clutch member 21 such that when the switch activating member 42 is displaced to the switch-on position (FIG. 8), the first clutch actuating member 21 is simultaneously displaced to the first actuating position (FIG. 5), and such that when the switch activating member 42 is displaced to the switch-off position (FIG. 9), the first clutch actuating member 21 is simultaneously displaced to the first non-actuating position (FIG. 4). In this embodiment, the synchronizing unit 31 includes first and second non-stretchable cords 43, 33, a first push stem 310, a first seat 315, a first biasing member 317, and a start push button 318.

The first non-stretchable cord 43 extends from the switch activating member 42 in a longitudinal direction (Y) to terminate at a first connection zone 301.

The second non-stretchable cord 33 extends from the first power region 212 of the first clutch actuating member 21 to terminate at the first connection zone 301.

The first push stem 310 has a first stem body 311. The first stem body 311 is configured to secure the first and second non-stretchable cords 43, 33 in the first connection zone 301, and is movable in the longitudinal direction (Y) between a first normal position (FIG. 6), where the switch activating member 42 and the first clutch actuating member 21 are in the switch-off position and the first non-actuating position, respectively, and a first stem actuating position (FIG. 8), where the switch activating member 42 and the first clutch actuating member 21 are in the switch-on position and the first actuating position, respectively. In this embodiment, the first stem body 311 has a first connection portion 312 and a first stem portion 313 opposite to the first connection portion 312 in the longitudinal direction (Y). The first push stem 310 further has a first flange 314 mounted on the first stem portion 313. The first and second non-stretchable cords 43, 33 are secured to the first connection portion 312.

The first seat 315 is secured to the base 1, and has a first through hole 316 to permit the first stem body 311 to extend therethrough such that the first flange 314 and the first connection portion 312 are disposed oppositely relative to the first seat 315.

The first biasing member 317 is disposed between the first flange 314 and the first seat 315 to bias the first stem body 311 to the first normal position (FIG. 6).

The start push button 318 is connected to the first push stem 310 for ease of manual operation.

Figure 10:
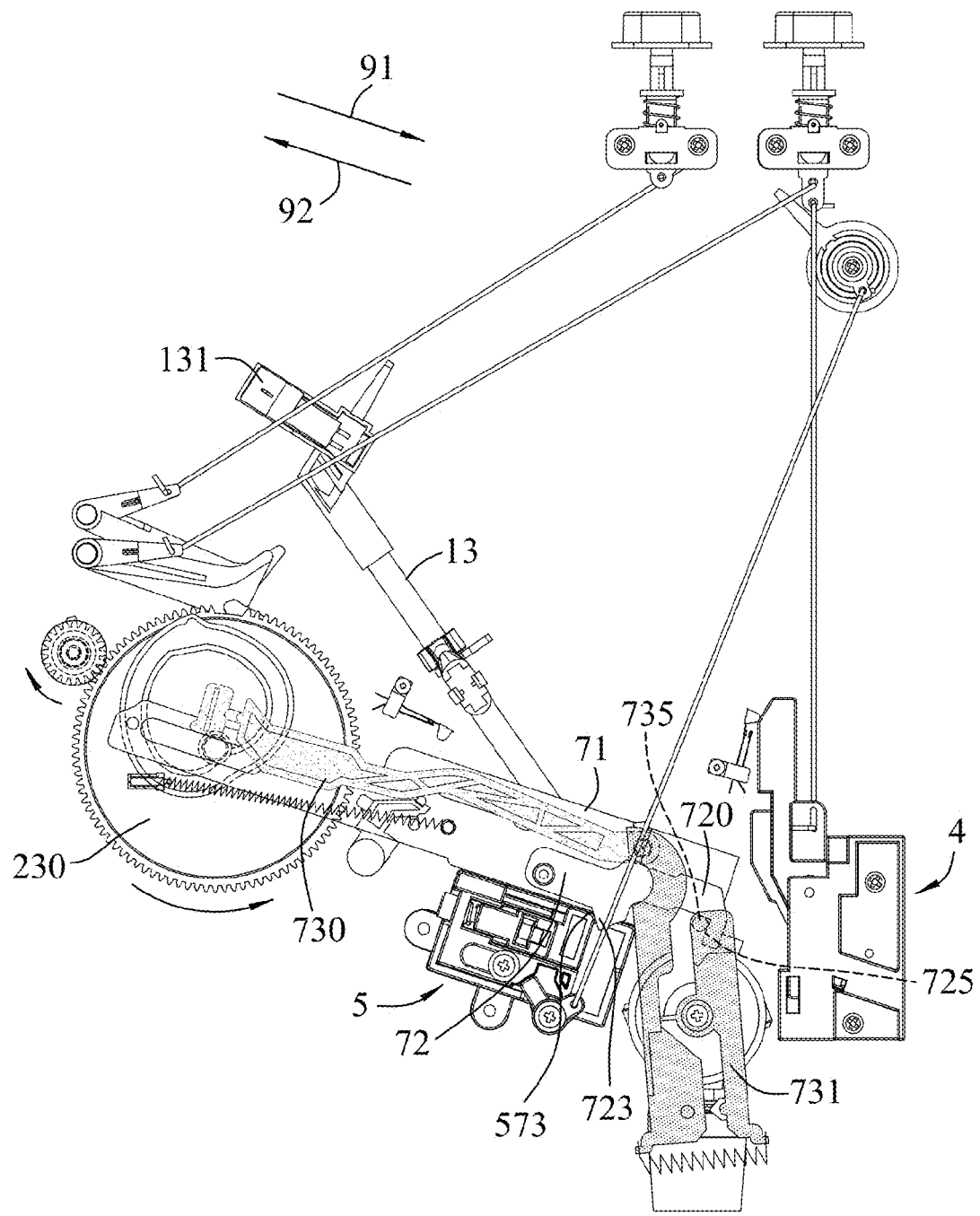
Figure 11:
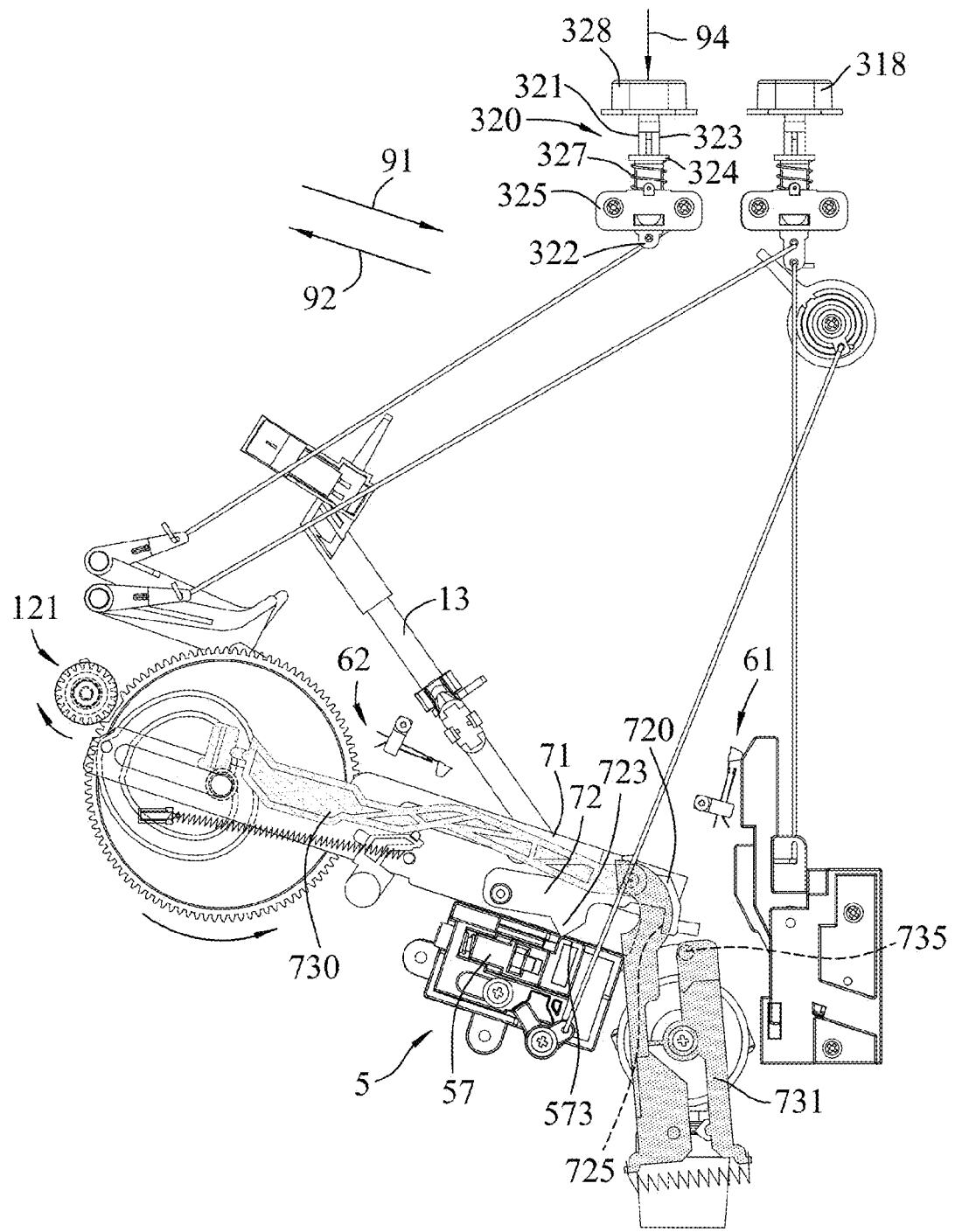

The position guide 731 is disposed to be rotatable with the lower hub 15 so as to permit the tonearm 13 to rotate with the position guide 731 about the swivel axis (S). The position guide 731 is configured to be hooked by the claw region 725 once the claw region 725 is displaced to the free position (FIGS. 9 and 10) so as to permit the tonearm 13 to be displaced from the outermost position (FIG. 1) to the starting position (FIG. 14) when the distal end 713 is displaced from the remote position (FIG. 9) toward the close position (FIG. 11). In this embodiment, the position guide 731 has a protuberance 735 configured to be hooked by the claw region 725 once the claw region 725 is displaced to the free position (FIGS. 9 and 10). When the claw region 725 is in the initial position, the protuberance 735 is not hooked by the claw region 725.

As shown in FIG. 3, the elongated member 730 has a coupling end 733 coupled to the position guide 731, and has an activating region 732. When the distal end 713 is in the close position and when the tonearm 13 is in the outermost position, the second micro-switch 62 is retained in a switch-off state by the activating region 732 (FIG. 6). When the distal end 713 is displaced from the close position or when the tonearm 13 is displaced from the outermost position, the second micro-switch 62 is set free from the activating region 732 and returns to the switch-on state. In this embodiment, the coupling end 733 is pivotally mounted to the position guide 731.

The position adjusting unit 5 is disposed on the lower surface 102 of the base 1 and includes a cam member 57 having a cam surface 573. When the distal end 713 is displaced from the remote position (FIG. 9) toward the close position (FIG. 11), the tonearm 13 is rotated with the position guide 731, and the cam follower protrusion 723 of the auxiliary arm 72 is brought into cam engagement with the cam surface 573 of the cam member 57 to thereby displace the claw region 725 from the free position to the initial position. Specifically, when the distal end 713 is displaced toward the close position, both the position guide 731 and the tonearm 13 are rotated until the camming action between the cam follower protrusion 723 and the cam surface 573 causes the claw region 725 to be displaced to the initial position where the protuberance 735 is not hooked by the claw region 725. At this point, the forward free end 131 of the tonearm 13 is disposed at the starting position. Thereafter, the distal end 713 is further moved to the close position (FIG. 11).

Figure 5:
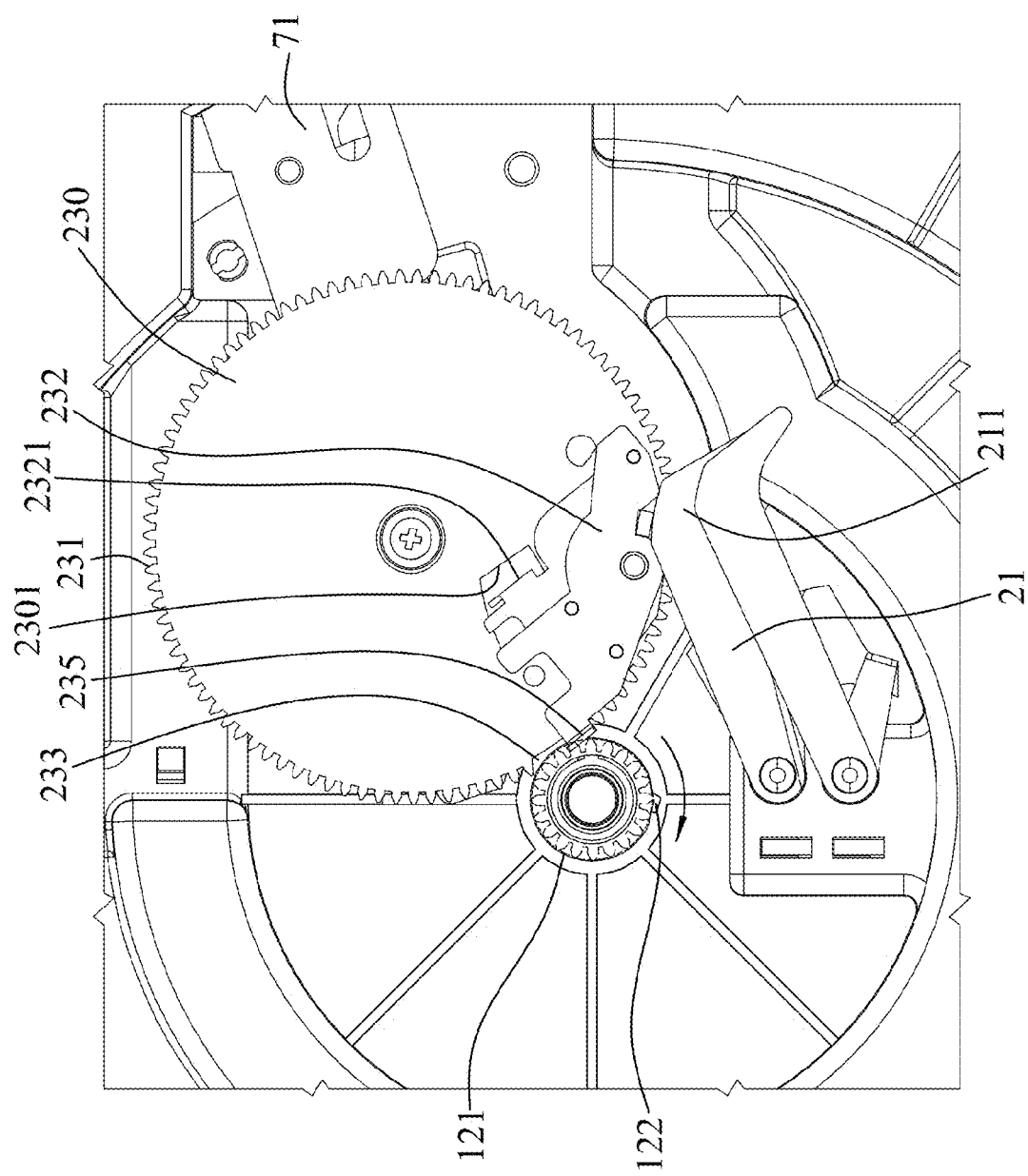
FIG. 5 is similar to FIG. 4, but showing a clutch end of a clutch member in an active position.

The transmission assembly 2 further includes a second clutch actuating member 22, and the distal end 713 of the arm body 710 has a pushing surface 714. The second clutch actuating member 22 is disposed in proximity of the wheel body 230 to actuate the clutch member 232 such that the clutch end 235 is displaced to the active position (FIG. 5), and is configured to be displaceable between a second actuating position (FIG. 12), where the clutch end 235 is in the active position, and a second non-actuating position, where the clutch end 235 is in the idle position (FIG. 4) or the first clutch actuating member 21 is in the first actuating position (FIG. 5). When the clutch member 232 is actuated by the second clutch actuating member 22 to cause displacement of the distal end 713 from the close position (FIG. 12) to the remote position (FIG. 13), the protuberance 735 is pushed by the pushing surface 714 to rotate the position guide 731 to thereby cause displacement of the tonearm 13 to the outermost position.

Figure 12:
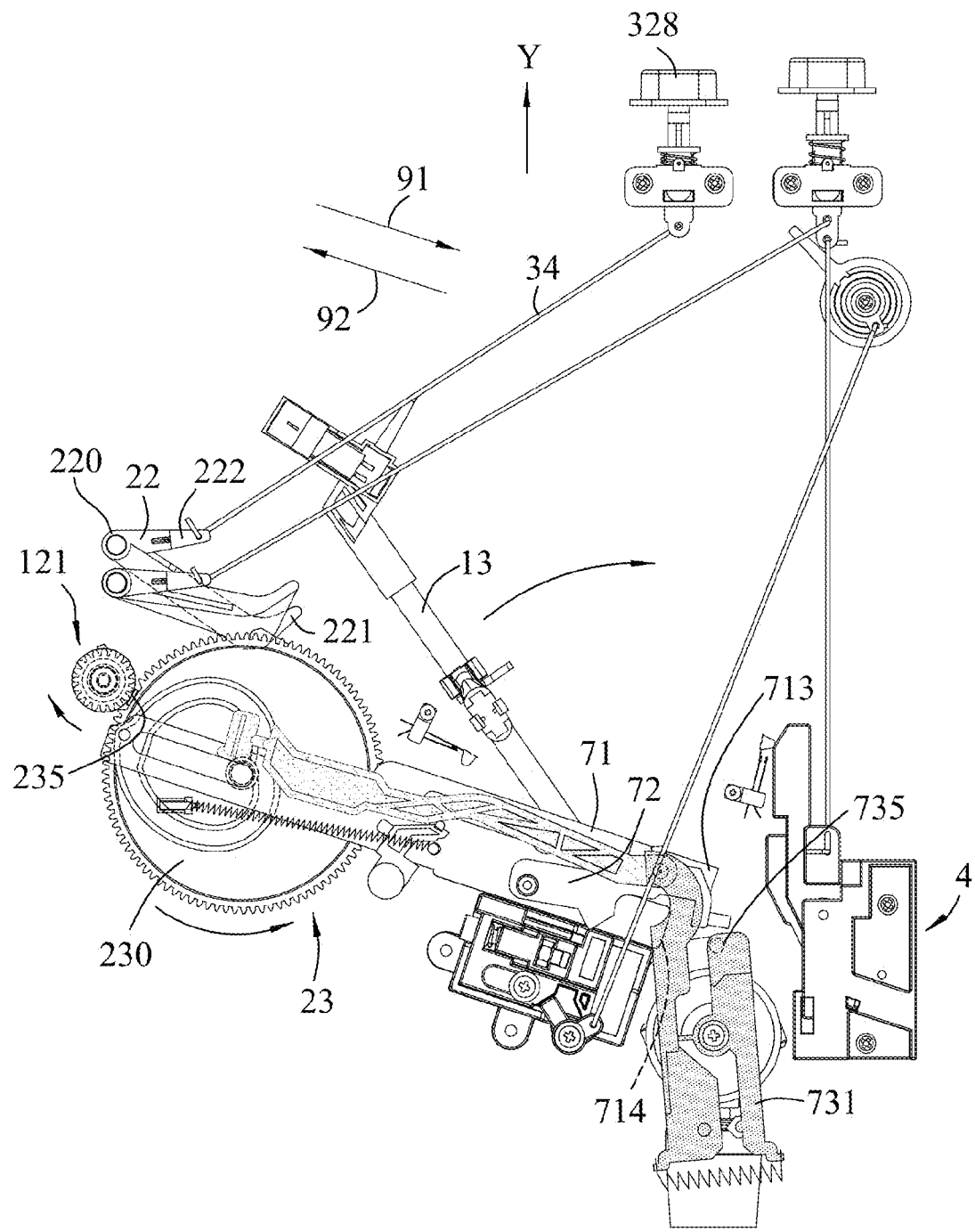
FIGS. 12 and 13 are similar to FIG. 11, but illustrating the operation of the control cam after a stop push button is depressed.

In this embodiment, the second clutch actuating member 22 is an angular lever and has a second fulcrum region 220 pivotally mounted to the base 1, a second power region 222, and a second weight region 221. The second weight region 221 is angularly displaced from the second power region 222, and is configured to displace the clutch end 235 of the clutch member 232 to the active position when the second clutch actuating member 22 is displaced to the second actuating position (FIG. 12).

In this embodiment, the play control assembly 3 further includes a third non-stretchable cord 34, a second push stem 320, a second seat 325, a second biasing member 327, and a stop push button 328.

The third non-stretchable cord 34 extends from the second power region 222 of the second clutch actuating member 22 to terminate at a second connection zone 302.

The second push stem 320 has a second stem body 321. The second stem body 321 is configured to secure the third non-stretchable cord 34 in the second connection zone 302, and is movable in the longitudinal direction (Y) between a second normal position (FIG. 11), where the second clutch actuating member 22 is in the second non-actuating position (FIG. 4), and a second stem actuating position (FIG. 12), where the second clutch actuating member 22 is in the second actuating position. In this embodiment, the second stem body 321 has a second connection portion 322 and a second stem portion 323 opposite to the second connection portion 322 in the longitudinal direction (Y). The second push stem 320 further has a second flange 324 mounted on the second stem portion 323. The third non-stretchable cord 34 is secured to the second connection portion 322.

The second seat 325 is secured to the base 1, and has a second through hole 326 to permit the second stem body 321 to extend therethrough such that the second flange 324 and the second connection portion 322 are disposed oppositely relative to the second seat 325.

The second biasing member 327 is disposed between the second flange 324 and the second seat 325 to bias the second stem body 321 to the second normal position.

The stop push button 328 is connected to the second push stem 320 for ease of manual operation.

Figure 14:
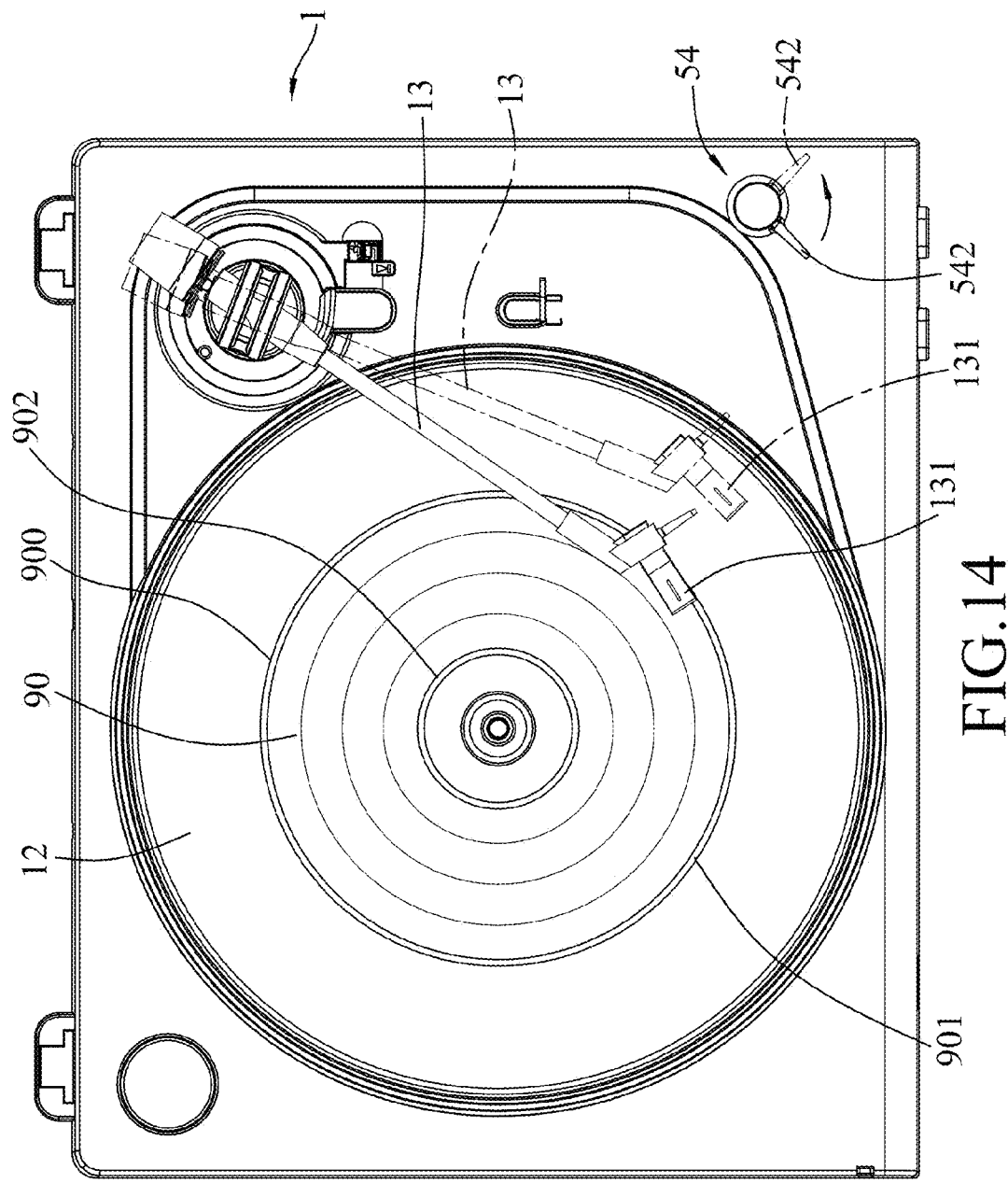
FIG. 14 is a top view of the automatic record player.

The clutch member 232 can be actuated by each of the first and second clutch actuating members 21, 22. As shown in FIGS. 6 and 8, when a manual force is exerted on the start push button 318 along an arrow direction 93, the clutch member 232 is actuated by the first clutch actuating member 21, and the tonearm 13 is displaced from the outermost position (FIGS. 1 and 6) to the starting position (FIGS. 10, 11, and 14). As shown in FIGS. 11 and 12, when the second micro-switch 62 is in the switch-on state and a manual force is exerted on the stop push button 328 along an arrow direction 94, the clutch member 232 is actuated by the second clutch actuating member 22, and the tonearm 13 is displaced to the outermost position.

As best shown in FIG. 3, the wheel body 230 has a through bore 2301, and the clutch member 232 has a bent tab 2321. The bent tab 2321 extends through the through bore 2301 and downwardly of the lower major surface 237 of the wheel body 230. The elongated member 730 further has a clutch actuating lead end 734 which is opposite to the coupling end 733 and which is guided by the guiding slot 111 during the displacement of the elongated member 730. Once the forward free end 131 of the tonearm 13 is displaced to the innermost position (i.e., record playing is completed), the bent tab 2321 is forced by the clutch actuating leading end 734 to move the clutch end 235 of the clutch member 232 to the active position to cause displacement of the distal end 713 from the close position to the remote position so as to permit the protuberance 735 to be pushed by the pushing surface 714 to thereby cause rotation of the position guide 73 and displacement of the tonearm 13 to the outermost position.

With reference to FIGS. 1 and 6, the pinion 121 normally faces the cutout portion 233 of the control cam 23 when the record player is not in operation. To play the phonograph record 90 (which is a 7-inch record in this case) on the turntable 12, the start push button 318 is depressed along the arrow direction 93 to actuate both the switch activating member 42 and the first clutch actuating member 21 so as to permit the wheel body 230 of the control cam 23 to rotate with the pinion 121 (at this point, the pinion 121 does not face the cutout portion 233). The wheel body 230 rotates one cycle (see FIGS. 8 to 11) to permit the tonearm 13 to be automatically placed in the starting position (FIG. 11) and then stops rotating (at this point, the pinion 121 faces the cutout portion 233 again). To stop playing, the stop push button 328 may be depressed along the arrow direction 94 (see FIG. 11) to actuate the second clutch actuating member 22 to permit the wheel body 230 of the control cam 23 to rotate with the pinion 121 (at this point, the pinion 121 does not face the cutout portion 233). The wheel body 230 rotates one cycle (see FIGS. 11 to 13 and FIG. 6) to permit the tonearm 13 to be automatically placed in the outermost position (FIG. 6) and then stops rotating (at this point, the pinion 121 faces the cutout portion 233 again).

On the other hand, when record playing is completed, i.e., the tonearm 13 is displaced to the innermost position, the clutch actuating lead end 734 of the elongated member 730 will actuate the clutch member 232 to cause automatic displacement of the tonearm 13 from the innermost position to the outermost position.

Figure 15:
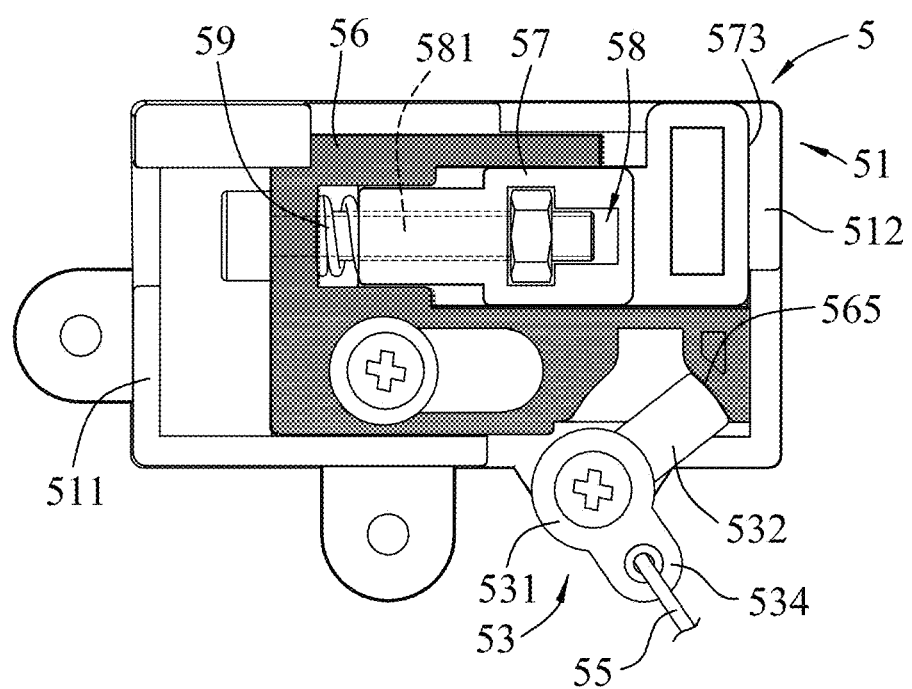
FIG. 15 is similar to FIG. 7, but showing a cam surface of a cam member in a proximate position.
Figure 16:
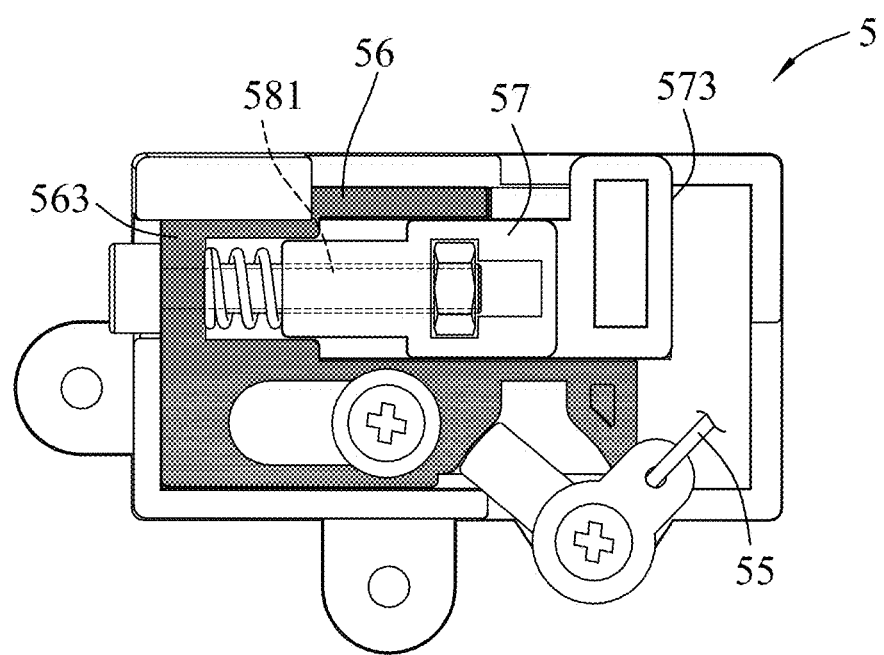
FIG. 16 is similar to FIG. 7, but showing the cam surface in an adjusted position.

To play a 12-inch phonograph record (not shown), for example, the cam surface 573 can be actuated to displace from a distal position (FIG. 7) to a proximate position (FIG. 15). When in the proximate position, the cam surface 573 is closer to the lower hub 15 (the lower hub 15 is not shown in FIG. 14 but shown in FIG. 6) so that the forward free end 131 of the tonearm 13 is displaced to be in vertical register with an outermost groove of the 12-inch phonograph record (not shown). In FIG. 14, the forward free end 131 of the tonearm 13 drawn in solid lines is in the starting position for playing a 7-inch phonograph record 90, and the forward free end 131 of the tonearm 13 drawn in imaginary lines is in the starting position for playing a 12-inch phonograph record (not shown).

For playing phonograph records of different sizes, the position adjusting unit 5 further includes a frame 51, a lever member 53, a size selection member 54, a fourth non-stretchable cord 55, and a carrier body 56.

The frame 51 is disposed on the lower surface 102 of the base 1, and defines a guideway 513. In this embodiment, the frame 51 has first and second walls 511, 512 which extend downwardly from the lower surface 102, and which are parallel to and spaced apart from each other.

Figure 7:
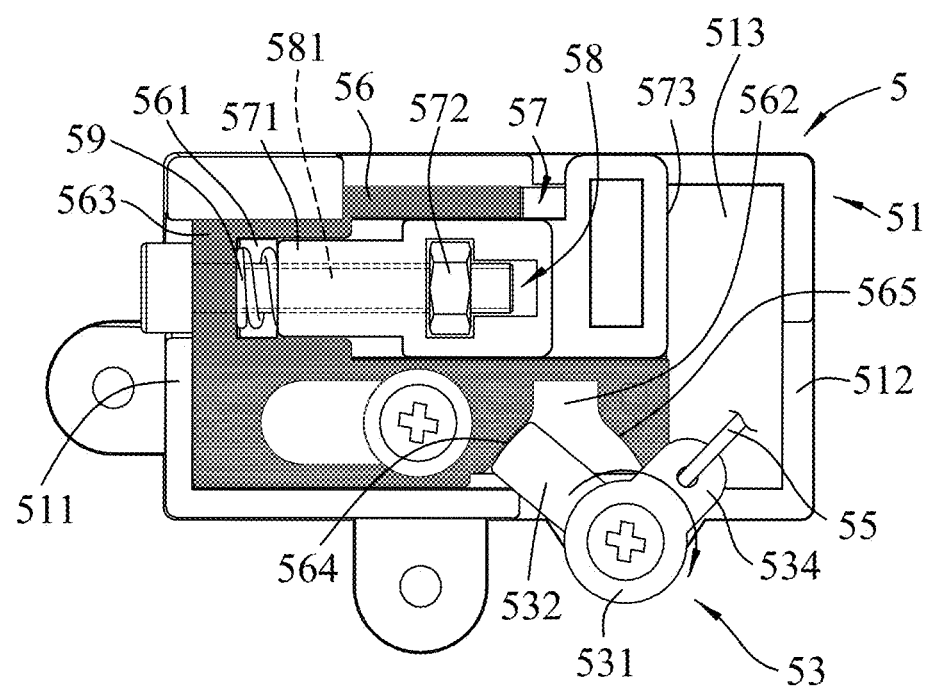
FIG. 7 is a fragmentary enlarged view of a position adjusting unit of the automatic record player.

The carrier body 56 is slidably mounted in the guideway 513 to carry the cam member 57 therein such that the cam surface 573 extends outwardly of the carrier body 56 and is displaceable between the distal and proximate positions (FIGS. 7 and 15). In this embodiment, the carrier body 56 has first and second receiving spaces 561, 562, and a side wall 563 facing toward the first wall 511. The cam member 57 is received in the first receiving space 561 with the cam surface 573 facing toward the second wall 512.

The lever member 53 has a lever fulcrum region 531 pivotally mounted on the frame 51, a lever power end 534, and a lever weight end 532. The lever weight end 532 is angularly displaced from the lever power end 534, and is configured to actuate the carrier body 56 to slide along the guideway 513 so as to displace the cam surface 573 between the distal and proximate positions. In this embodiment, the carrier body 56 has first and second surfaces 564, 565 which define the second receiving space 562 therebetween, and which are disposed proximate to and distal from the first wall 511, respectively. Each of the first and second surfaces 564, 565 extends in a direction transverse to an extending direction of the first wall 511. The lever weight end 532 is received in the second receiving space 562. When the cam surface 573 is in the distal position (FIG. 7), the lever weight end 532 abuts against the first surface 564. When the cam surface 573 is in the proximate position (FIG. 15), the lever weight end 532 abuts against the second surface 565.

As shown in FIG. 6, the fourth non-stretchable cord 55 extends from the lever power end 534 of the lever member 53 to a third connection zone 550. In this embodiment, each of the first, second, third, and fourth non-stretchable cords 43, 33, 34, 55 is made of metal.

The size selection member 54 has a twistable body 541 and a finger tab 542. The twistable body 541 is pivotally mounted on the upper surface 101 of the base 1, and is configured to secure the fourth non-stretchable cord 55 in the third connection zone 550. The finger tab 542 extends radially from the twistable body 541 to be angularly displaceable between first and second size positions that correspond to the distal and proximate positions (FIGS. 7 and 15), respectively. In FIG. 14, the finger tab 541 drawn in solid lines is in the first size position, and the finger tab 541 drawn in imaginary lines is in the second position.

With reference to FIG. 7, the position adjusting unit 5 further includes a micro-adjustment member 58 which is disposed between the carrier body 56 and the cam member 57 and which is configured to permit micro-adjustment of the position of the cam surface 573 relative to the carrier body 56. The micro-adjustment member 58 has a screw bolt 581, a spring 59, and a screw nut 572. The screw bolt 581 extends through a main body 571 of the cam member 57 and is fixed to the side wall 563 of the carrier body 56. The screw nut 572 is engaged by the main body 571 and is threadedly engaged with the screw bolt 581. By rotating the screw nut 572, the cam member 57 is permitted to be displaced in the first receiving space 561. The spring 59 is sleeved on the screw bolt 581 and is disposed between the side wall 563 and the cam member 57 for stabilizing the movement of the cam member 57 in the first receiving space 561.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An automatic record player for playing a phonograph record, comprising:
   a base having upper and lower surfaces opposite to each other in an upright direction;
   a turntable rotatably mounted on said upper surface of said base about a turntable axis for supporting the phonograph record;
   upper and lower hubs which are coaxially and rotatably mounted on said upper and lower surfaces of said base, respectively, and which are configured to be co-rotatable about a swivel axis parallel to the turntable axis, said upper hub being disposed outwardly from said turntable;
   a tonearm having a forward free end and a rearward end which is coupled to and rotatable with said upper hub about the swivel axis so as to permit said forward free end to be angularly displaceable among an outermost position, where said forward free end is disposed beyond a marginal edge of said phonograph record, a starting position, where said forward free end is in vertical register with an outermost groove of the phonograph record, and an innermost position, where said forward free end is in vertical register with an innermost groove of the phonograph record;

a drive unit having an output shaft configured to drive said turntable to rotate about the turntable axis;

a pinion having gear teeth and disposed on a lower surface of said turntable to be rotated with said turntable about the turntable axis;

a control cam having a wheel body which defines a wheel axis, and a plurality of driven teeth which are disposed on a rim of said wheel body to surround the wheel axis, and which are configured to mesh with said gear teeth of said pinion so as to permit said wheel body to be driven by said pinion, said control cam further having a cutout portion configured to interrupt said driven teeth, said wheel body having upper and lower major surfaces, said lower major surface having a cycle route which has an origin point and a midway point;

a main arm including an arm body having proximate and distal ends, and a cam follower pin which is fixed to said proximate end, and which is configured to be guided by and moved along said cycle route such that when said cam follower pin is moved from said origin point to said midway point, said distal end is displaced from a close position to a remote position, and such that when said cam follower pin is moved from said midway point back to said origin point, said distal end is displaced from the remote position to the close position;

an auxiliary arm pivotally mounted on said main arm about a pivot axis, and having a claw end segment which includes a cam follower region and a claw region, said claw region being angularly displaceable about the pivot axis between an initial position and a free position;

first and second micro-switches disposed distal from and proximate to said wheel body, respectively, and electrically connected to said drive unit such that when at least one of said first and second micro-switches is in a switch-on state, said turntable is driven by said output shaft to rotate about the turntable axis;

a clutch member pivotally mounted on said upper major surface of said wheel body, and having a clutch end which is angularly displaceable between an idle position, where said clutch end is disposed away from said cutout portion, and an active position, where said clutch end extends into said cutout portion to permit said clutch end to be engaged with said pinion so as to initiate rotation of said wheel body through meshing engagement between said driven teeth of said control cam and said gear teeth of said pinion;

a first clutch actuating member which is disposed in proximity of said wheel body to displace said clutch end to the active position, and which is configured to be displaceable between a first actuating position, where said clutch end is in the active position, and a first non-actuating position, where said clutch end is in the idle position;

a switch activating member which has a switch activating region and a cam region, and which is displaceable between a switch-off position and a switch-on position, said switch activating region being configured such that when said switch activating member is in the switch-off position, said first micro-switch is retained in a switch-off state by said switch activating region, and such that when said switch activating member is displaced to the switch-on position, said first micro-switch is set free from said switch activating region and returns to the switch-on state, said cam region being configured such that when said switch activating member is displaced from the switch-off position to the switch-on position to thereby permit said distal end of said arm body to be displaced from the close position to the remote position, said cam follower region is brought into cam engagement with said cam region to thereby displace said claw region to the free position;

an actuating pin disposed on said claw end segment and configured to force said switch activating member back to the switch-off position once said claw region is displaced to the free position;

a synchronizing unit configured to couple said switch activating member to said first clutch member such that when said switch activating member is displaced to the switch-on position, said first clutch actuating member is simultaneously displaced to the first actuating position, and such that when said switch activating member is displaced to the switch-off position, said first clutch actuating member is simultaneously displaced to the first non-actuating position;

a position guide disposed to be rotatable with said lower hub so as to permit said tonearm to rotate with said position guide about the swivel axis, said position guide being configured to be hooked by said claw region once said claw region is displaced to the free position so as to permit said tonearm to be displaced from the outermost position to the starting position when said distal end is displaced from the remote position toward the close position; and an elongated member coupled to said position guide, and having an activating region which is configured such that said second micro-switch is retained in a switch-off state by said activating region when said distal end is in the close position and when said tonearm is in the outermost position, and such that when said distal end is displaced from the close position or when said tonearm is displaced from the outermost position, said second micro-switch is set free from said activating region and returns to the switch-on state.

2. The automatic record player according to claim 1, wherein said first clutch actuating member is an angular lever and has a first fulcrum region pivotally mounted to said base, a first power region, and a first weight region which is angularly displaced from said first power region, and which is configured to displace said clutch end of said clutch member to the active position when said first clutch actuating member is displaced to the first actuating position, and wherein said synchronizing unit includes a first non-stretchable cord extending from said switch activating member in a longitudinal direction to terminate at a first connection zone, a second non-stretchable cord extending from said first power region of said first clutch actuating member to terminate at said first connection zone, and a first push stem having a first stem body which is configured to secure said first and second non-stretchable cords in said first connection zone, and which is movable in the longitudinal direction between a first normal position, where said switch activating member and said first clutch actuating member are in the switch-off position and the first non-actuating position, respectively, and a first stem actuating position, where said switch activating member and said first clutch actuating member are in the switch-on position and the first actuating position, respectively.

3. The automatic record player according to claim 2, wherein said first stem body has a first connection portion to which said first and second non-stretchable cords are secured, and a first stem portion which is opposite to said first connection portion in the longitudinal direction, said first push stem further having a first flange which is mounted on said first stem portion, said synchronizing unit further including
- a first seat secured to said base, and having a first through hole to permit said first stem body to extend therethrough such that said first flange and said first connection portion are disposed oppositely relative to said first seat,
- a first biasing member disposed between said first flange and said first seat to bias said first stem body to the first normal position, and
- a start push button connected to said first push stem.

4. The automatic record player according to claim 1, wherein said position guide has a protuberance configured to be hooked by said claw region once said claw region is displaced to the free position.

5. The automatic record player according to claim 4, wherein said auxiliary arm further has a cam follower protrusion, said automatic record player further comprising a position adjusting unit which is disposed on said base and which includes a cam member having a cam surface configured such that when said distal end is displaced from the remote position toward the close position, said cam follower protrusion is brought into cam engagement with said cam surface of said cam member to thereby displace said claw region to the initial position.

6. The automatic record player according to claim 4, further comprising a second clutch actuating member which is disposed in proximity of said wheel body to actuate said clutch member such that said clutch end is displaced to the active position, and which is configured to be displaceable between a second actuating position, where said clutch end is in the active position, and a second non-actuating position, where said clutch end is in the idle position or said first clutch actuating member is in the first actuating position,
wherein said distal end of said arm body has a pushing surface configured such that when said clutch member is actuated by said second clutch actuating member to cause displacement of said distal end to the remote position, said protuberance is pushed by said pushing surface to cause rotation of said position guide and displacement of said tonearm to the outermost position.

7. The automatic record player according to claim 6, wherein said second clutch actuating member is an angular lever and has a second fulcrum region pivotally mounted to said base, a second power region, and a second weight region which is angularly displaced from said second power region, and which is configured to displace said clutch end of said clutch member to the active position when said second clutch actuating member is displaced to the second actuating position, and wherein said automatic record player further comprising:
- a third non-stretchable cord extending from said second power region of said second clutch actuating member to terminate at a second connection zone; and
- a second push stem having a second stem body which is configured to secure said third non-stretchable cord in said second connection zone, and which is movable in the longitudinal direction between a second normal position, where said second clutch actuating member is in the second non-actuating position, and a second stem actuating position, where said second clutch actuating member is in the second actuating position.

8. The automatic record player according to claim 7, wherein said second stem body has a second connection portion to which said third non-stretchable cord is secured, and a second stem portion which is opposite to said second connection portion in the longitudinal direction, said second push stem further having a second flange which is mounted on said second stem portion, said automatic record player further comprising:
- a second seat secured to said base and having a second through hole to permit said second stem body to extend therethrough such that said second flange and said second connection portion are disposed oppositely relative to said second seat;
- a second biasing member disposed between said second flange and said second seat to bias said second stem body to the second normal position; and
- a stop push button connected to said second push stem.

9. The automatic record player according to claim 6, wherein said wheel body has a through bore, said clutch member having a bent tab which extends through said through bore and downwardly of said lower major surface of said wheel body, said elongated member having a clutch actuating lead end configured such that once said forward free end of said tonearm is displaced to the innermost position, said bent tab is forced by said clutch actuating leading end to move said clutch end of said clutch member to the active position to cause displacement of said distal end to the remote position so as to permit said protuberance to be pushed by said pushing surface to thereby cause rotation of said position guide and displacement of said tonearm to the outermost position.

10. The automatic record player according to claim 5, wherein said position adjusting unit further includes
- a frame disposed on said lower surface of said base, and defining a guideway,
- a carrier body slidably mounted in said guideway to carry said cam member therein such that said cam surface extends outwardly of said carrier body, so as to permit said cam surface to be displaceable between distal and proximate positions, and
- a lever member having a lever fulcrum region pivotally mounted on said frame, a lever power end, and a lever weight end which is angularly displaced from said lever power end, and which is configured to actuate said carrier body to slide along said guideway so as to displace said cam surface between the distal and proximate positions.

11. The automatic record player according to claim 10, wherein said position adjusting unit further includes
- a fourth non-stretchable cord extending from said lever power end of said lever member to a third connection zone, and
- a size selection member having a twistable body pivotally mounted on said upper surface of said base, and configured to secure said fourth non-stretchable cord in said third connection zone, and a finger tab extending radially from said twistable body to be angularly displaceable between first and second size positions that correspond to the distal and proximate positions, respectively.

12. The automatic record player according to claim 10, wherein said position adjusting unit further includes a micro-adjustment member which is disposed between said carrier body and said cam member and which is configured to permit micro-adjustment of a position of said cam surface relative to said carrier body.

* * * * *